(12) United States Patent
Darvish Rouhani et al.

(10) Patent No.: US 12,645,932 B2
(45) Date of Patent: Jun. 2, 2026

(54) SPARSIFYING NARROW DATA FORMATS FOR NEURAL NETWORKS

(71) Applicant: Microsoft Technology Licensing, LLC, Redmond, WA (US)

(72) Inventors: Bita Darvish Rouhani, Bellevue, WA (US); Venmugil Elango, Redmond, WA (US); Eric S. Chung, Woodinville, WA (US); Douglas C Burger, Bellevue, WA (US); Mattheus C. Heddes, Redmond, WA (US); Nishit Shah, Sunnyvale, CA (US); Rasoul Shafipour, Redmond, WA (US); Ankit More, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1057 days.

(21) Appl. No.: 17/349,848

(22) Filed: Jun. 16, 2021

(65) Prior Publication Data

US 2022/0405571 A1 Dec. 22, 2022

(51) Int. Cl.
G06N 3/08 (2023.01)
G06F 17/16 (2006.01)
G06N 3/0495 (2023.01)

(52) U.S. Cl.
CPC ............... G06N 3/08 (2013.01); G06F 17/16 (2013.01); G06N 3/0495 (2023.01)

(58) Field of Classification Search
CPC ............ G06N 3/08; G06N 3/04; G06N 3/082; G06N 3/048; G06N 3/0495; G06F 17/16
See application file for complete search history.

(56) References Cited

U.S. PATENT DOCUMENTS 10,096,134 B2 * 10/2018 Yan .......................... G06N 3/045
11,469,772 B2 * 10/2022 Huang ................ G06F 13/4027
(Continued)

FOREIGN PATENT DOCUMENTS

GB        2543857 B  *  4/2018   ............. G06F 21/62
JP     2019049977 A     3/2019
(Continued)

OTHER PUBLICATIONS

Naigang Wang, Jungwook Choi, Daniel Brand, Chia-Yu Chen and Kailash Gopalakrishnan, "Training Deep Neural Networks with 8-bit Floating Point Numbers", Dec. 19, 2018, arXiv:1812.08011v1, pp. 1-11 (Year: 2018).*
(Continued)

*Primary Examiner* — Omar F Fernandez Rivas
(74) *Attorney, Agent, or Firm* — Holzer Patel Drennan

(57)        ABSTRACT

Embodiments of the present disclosure include systems and methods for sparsifying narrow data formats for neural networks. A plurality of activation values in a neural network are provided to a muxing unit. A set of sparsification operations are performed on a plurality of weight values to generate a subset of the plurality of weight values and mask values associated with the plurality of weight values. The subset of the plurality of weight values are provided to a matrix multiplication unit. The muxing unit generates a subset of the plurality of activation values based on the mask values and provides the subset of the plurality of activation values to the matrix multiplication unit. The matrix multiplication unit performs a set of matrix multiplication operations on the subset of the plurality of weight values and the subset of the plurality of activation values to generate a set of outputs.

20 Claims, 9 Drawing Sheets

(56) References Cited

U.S. PATENT DOCUMENTS

| | | | | |
|---|---|---|---|---|
| 2019/0026078 A1* | 1/2019 | Bannon | ..................... | G06F 7/52 |
| 2019/0087713 A1* | 3/2019 | Lamb | .................. | G06N 3/0495 |
| 2019/0171448 A1* | 6/2019 | Chen | .................. | G06F 9/30036 |
| 2019/0228051 A1* | 7/2019 | Langhammer | .......... | G06F 17/16 |
| 2020/0150926 A1* | 5/2020 | Connor | ................. | G06F 9/3001 |
| 2022/0188611 A1* | 6/2022 | Hazanchuk | .......... | G06N 3/0464 |
| 2023/0229917 A1* | 7/2023 | Wu | ........................ | G06N 3/045 |
| | | | | 706/25 |

FOREIGN PATENT DOCUMENTS

| | | | |
|---|---|---|---|
| JP | 2019212295 A | 12/2019 | |
| JP | 6856112 B1 | 4/2021 | |
| WO | 2019157599 A1 | 8/2019 | |

OTHER PUBLICATIONS

Valentina Popescu; Marcel Nassar; Xin Wang; Evren Tumer; Tristania Webb, "Flexpoint: Predictive Numerics for Deep Learning", Sep. 16, 2018, IEEE, pp. 1-4 (Year: 2018).*

Julian Faraone , Martin Kumm , Martin Hardieck, Peter Zipf, Xueyuan Liu, David Boland, and Philip H. W. Leong, "AddNet: Deep Neural Networks Using FPGA-Optimized Multipliers", Nov. 19, 2019, IEEE, pp. 115-128 (Year: 2019).*

Torsten Hoefler, Dan Alistarh, Tal Ben-Nun, Nikoli Dryden, "Sparsity in Deep Learning: Pruning and growth for efficient inference and training in neural networks", Jan. 31, 2021, arXiv:2102.00554v, pp. 1-90 (Year: 2021).*

Jongsoo Park et al., "Faster CNNS With Direct Sparse Convolutions and Guided Pruning", Jul. 28, 2017, arXiv:1608.01409v5 (Year: 2017).*

Changwan Hong et al., "Efficient Sparse-Matrix Multi-Vector Product on GPUs", Jun. 11, 2018, HPDC '18 (Year: 2018).*

Naigang Wang, Jungwook Choi, Daniel Brand, Chia-Yu Chen and Kailash Gopalakrishnan, "Training Deep Neural Networks with 8-bit Floating Point Numbers", Dec. 19, 2018, arXiv:1812.08011v1 (Year: 2018).*

Valentina Popescu; Marcel Nassar; Xin Wang; Evren Tumer; Tristania Webb, "Flexpoint: Predictive Numerics for Deep Learning", Sep. 16, 2018, IEEE (Year: 2018).*

Julian Faraone , Martin Kumm , Martin Hardieck, Peter Zipf, Xueyuan Liu, David Boland, and Philip H. W. Leong, "AddNet: Deep Neural Networks Using FPGA-Optimized Multipliers", Nov. 19, 2019, IEEE (Year: 2019).*

Torsten Hoefler, Dan Alistarh, Tal Ben-Nun, Nikoli Dryden, "Sparsity in Deep Learning: Pruning and growth for efficient inference and training in neural networks", Jan. 31, 2021, arXiv:2102.00554v (Year: 2021).*

Stack Overflow et al., "What is Bit Masking?", stored on Internet Archive on Apr. 11, 2017, Stack Overflow, https://stackoverflow.com/questions/10493411/what-is-bit-masking (Year: 2017).*

Hoefler, et al., "Sparsity in Deep Learning: Pruning and Growth for Efficient Inference and Training in Neural Networks", In Repository of arXiv:2102.00554v1, Jan. 31, 2021, 90 Pages.

Javaheripi, et al., "SWNet: Small-World Neural Networks and Rapid Convergence", In Repository of arXiv:1904.04862v1, Apr. 9, 2019, 9 Pages.

"International Search Report and Written Opinion Issued in PCT Application No. PCT/US22/028875", Mailed Date: Jul. 19, 2022, 9 Pages.

Raihan, et al., "Sparse Weight Activation Training", In Repository of arXiv:2001.01969v3, Oct. 31, 2020, 24 Pages.

Rouhani, et al., "Pushing the Limits of Narrow Precision Inferencing at Cloud Scale with Microsoft Floating Point", In Proceedings of 34th Conference on Neural Information Processing Systems, Jan. 1, 2020, 11 Pages.

First Office Action Received for Chinese Application No. 202280042941.4, mailed on Mar. 27, 2026, 08 Pages. (English Translation Provided).

Office Action Received for Japan Application No. 2023-575388, mailed on Mar. 10, 2026, 08 Pages. (English Translation Provided).

* cited by examiner

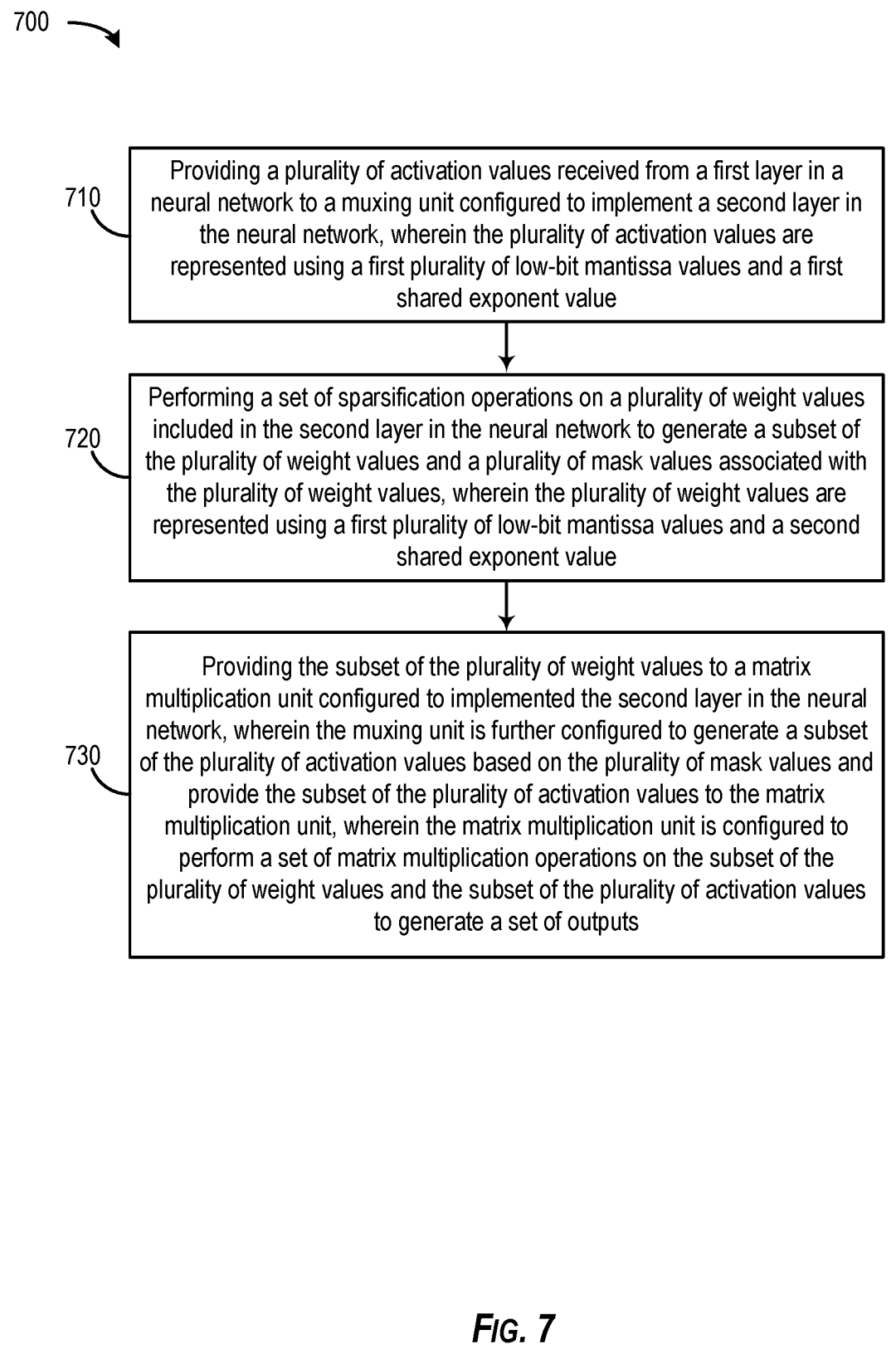

700

710 Providing a plurality of activation values received from a first layer in a neural network to a muxing unit configured to implement a second layer in the neural network, wherein the plurality of activation values are represented using a first plurality of low-bit mantissa values and a first shared exponent value 720 Performing a set of sparsification operations on a plurality of weight values included in the second layer in the neural network to generate a subset of the plurality of weight values and a plurality of mask values associated with the plurality of weight values, wherein the plurality of weight values are represented using a first plurality of low-bit mantissa values and a second shared exponent value 730 Providing the subset of the plurality of weight values to a matrix multiplication unit configured to implemented the second layer in the neural network, wherein the muxing unit is further configured to generate a subset of the plurality of activation values based on the plurality of mask values and provide the subset of the plurality of activation values to the matrix multiplication unit, wherein the matrix multiplication unit is configured to perform a set of matrix multiplication operations on the subset of the plurality of weight values and the subset of the plurality of activation values to generate a set of outputs

*FIG. 7*

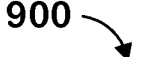
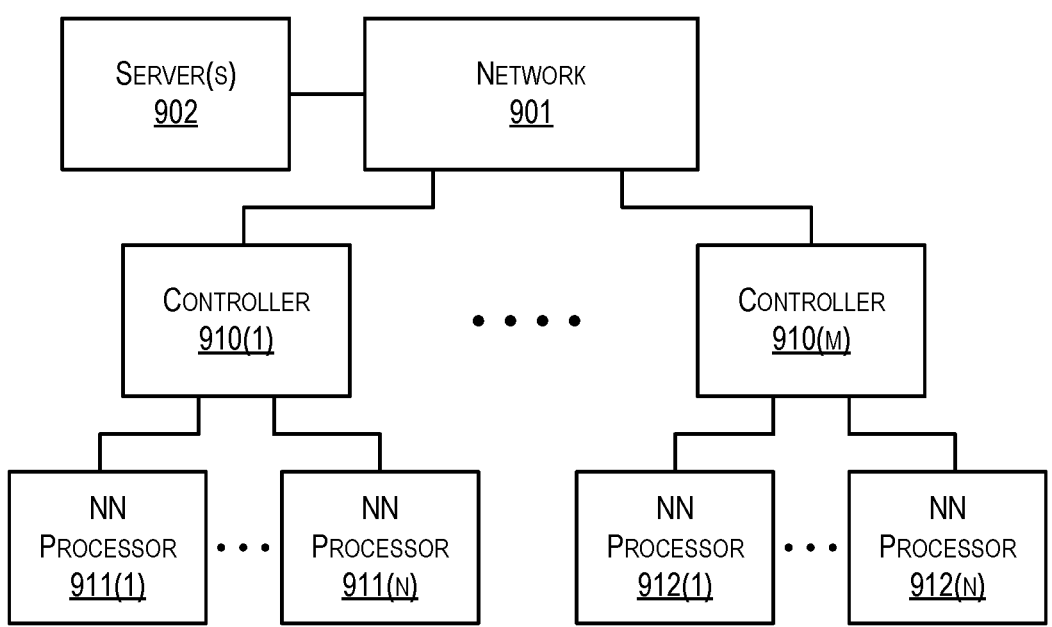
*FIG. 9*

SPARSIFYING NARROW DATA FORMATS FOR NEURAL NETWORKS

BACKGROUND

The present disclosure relates to computing hardware. More particularly, the present disclosure relates to techniques for training and using neural networks.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

Deep neural networks (DNNs) have grown exponentially in size over the past years in order to achieve better accuracies. Despite their high accuracies, DNNs typically need significant computational cost both in training and inference. Different types of techniques can be used to reduce computations costs associated with DNNs and/or reduce the size of DNNs. One type of technique is adding sparsity techniques. These techniques introduce sparsity to input data, weights, and/or activations.

BRIEF DESCRIPTION OF THE DRAWINGS

Various embodiments of the present disclosure are illustrated by way of example and not limitation in the figures of the accompanying drawings.

FIG. 7 illustrates a process for sparsifying narrow data formatted data according to some embodiments.

FIG. 9 illustrates a neural network processing system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for sparsifying narrow data formats for neural networks. In some embodiments, a computing system provides a tool for sparsifying inputs to each layer in a neural network when training the neural network or using the neural network for inference. Data used to implement the neural networks may be narrow data formats. Narrow data formats may include floating point data formats that use a low number of bits (e.g., 1-4 bits for a mantissa) for representing some or all parts of floating point numbers. In contrast, wide data format can include conventional floating point formats (e.g., a single-precision floating point format (e.g., FP32 or float32), a double-precision floating point format (e.g., FP64 or float64), a half-precision floating point format (e.g., FP16), etc.) or any floating point data formats in which a mantissa larger than 4 bits is used. To sparsify an input to a neural network layer, the tool processes a vector of input values in defined size blocks. For each block of input values, the tool determines a defined proportion of the values to prune (e.g., drop). The remaining input values are used as inputs to the neural network layer (e.g., for training the neural network, for using the neural network for inference, etc.). The tool can sparsify one or more inputs to each layer of the neural network.

The techniques described in the present application provide a number of benefits and advantages over conventional methods of training and using neural networks. For instance, using narrow data formats to implement a neural network and then sparsifying the inputs to the layers of the neural network reduces the number of cycles it takes for some of the hardware used to implement the layers of the neural network to execute operations. Conventional methods of training and using neural networks would require more cycles to execute the same operations.

Figure 1:
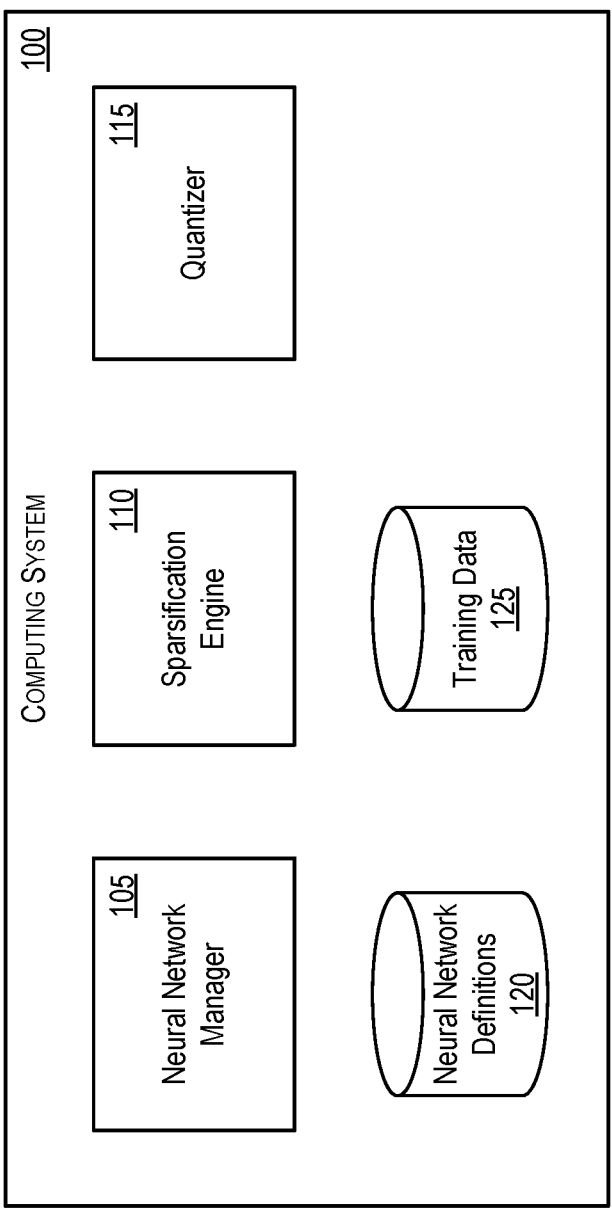
FIG. 1 illustrates a computing system for sparsifying narrow data formats for neural networks according to some embodiments.

FIG. 1 illustrates a computing system for sparsifying narrow data formats for neural networks according to some embodiments. As shown, computing system 100 includes neural network manager 105, sparsification engine 110, quantizer 115, neural network definition storage 120, and training data storage 125. Neural network definitions storage 120 is configured to store definitions of neural networks. In some embodiments, a definition of a neural network specifies the number of layers in the neural network, the number of nodes in each layer, the weights in the neural network, the activations functions used in the nodes, the loss function used to compute losses, etc.

Training data storage 125 stores training data sets for training neural networks. In some embodiments, a training data set includes a set of samples (also referred to as training samples). Each sample includes a set of inputs (also referred to as input data) and a set of expected outputs (also referred to as expected output data). For example, a set of inputs of a sample can be a matrix or vector of a set of numerical values (e.g., integers, floating point numbers, etc.). Similarly, a set of expected outputs of a sample can be a matrix or vector of a set of numerical values (e.g., integers, floating point numbers, etc.). In addition, training data storage 125 may store training parameters used for training neural networks. Examples of training parameters may include a number of samples in a training data set, a batch size (e.g., a number of samples to process in a training iteration), an exponent block size (e.g., a number of values that share an exponent), a sparsity block size (e.g., a number of values in a block that is processed during sparsification), a defined proportion of values to keep or drop in a sparsity block, etc.

In some embodiments, neural network definition storage 120 and training data storage 125 are implemented in a single physical storage while, in other embodiments, the neural network definition storage 120 and the training data storage 125 may be implemented across several physical storages. While FIG. 1 shows the network definition storage 120 and training data storage 125 as part of computing system 100, one of ordinary skill in the art will appreciate that neural network definitions storage 120 and/or training data storage 125 may be external to computing system 100 in some embodiments.

Figure 2:
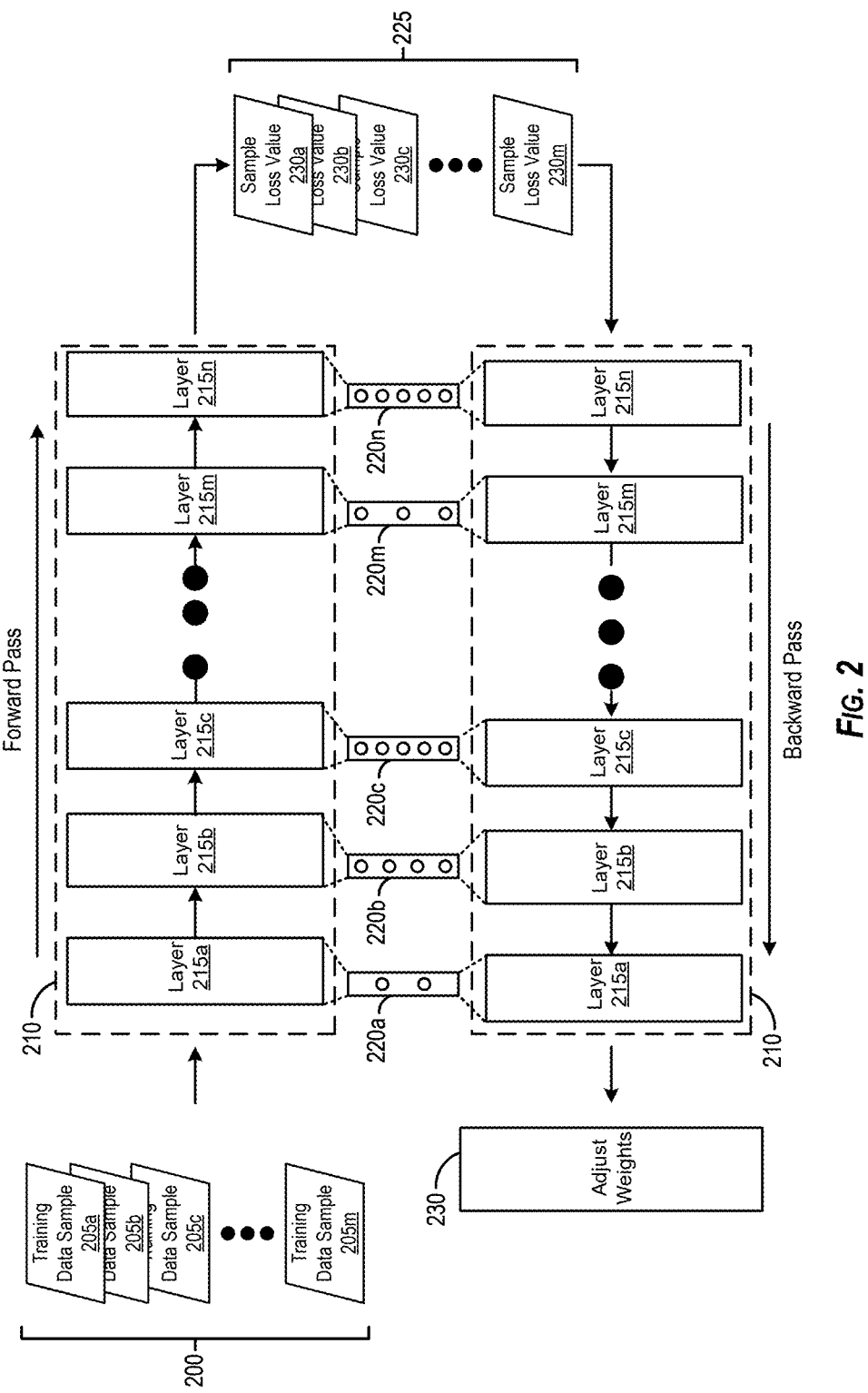
FIG. 2 illustrates an example training iteration for training a neural network according to some embodiments.

Neural network manager 105, sparsification engine 110, and quantizer 115 will now be described by reference to several example operations illustrated in FIGS. 2-6. The first example operation demonstrates how a neural network may be trained. For this operation, neural network manager 105 receives a request from computing system 100 (or another device such as a client device communicatively coupled to computing system 100) to train neural network 210 with a training data set. In response to the request, neural network manager 105 accesses neural network definitions storage 120 and retrieves the neural network definition associated with neural network 210 along with the training parameters associated with neural network 210. Neural network manager 105 then generates neural network 210 based on the neural network definition. As illustrated in FIG. 2, neural network 210 includes layers 215a-n. Each of the layers 215a-n include a set of corresponding weights 220. The weights may be represented using a narrow data format. As mentioned above, a narrow data format can be a floating point data format that uses a low number of bits (e.g., 1-4 bits for a mantissa) for representing some or all parts of floating point numbers. In this example, neural network manager 105 initializes the values of weights 220a-n with randomly generated values (e.g., integers, floating point numbers, etc.).

Neural network manager 105 then accesses training data storage 125 to retrieve the specified training data set for training neural network 210. Here, neural network manager 105 starts a training phase for neural network 210 in which a defined number of training iterations specified in the training parameters are performed on neural network 210. FIG. 2 illustrates an example training iteration for training neural network 210 according to some embodiments. Specifically, FIG. 2 shows an example of a training iteration that is performed on neural network 210 during the training phase for this example operation. For the training iteration, neural network 210 is trained using batch of samples 200, which includes training data samples 205a-m. The number of samples in batch of samples 200 is determined based on the batch size specified in the training parameters associated with neural network 210. To generate batch of samples 200, neural network manager 105 randomly selects samples 205a-m from the training data set. Then, neural network manager 105 processes each sample 205 in batch of samples 200 through a forward pass (also referred to as a feed forward pass) of neural network 210. Neural network 210 generates an output for each sample 205 that is processed through it.

Based on the outputs that neural network 210 generates for batch of samples 200 and the expected outputs of training data samples 205a-m in batch of samples 200, neural network manager 105 calculates corresponding loss values 230a-m. Neural network 210 can be configured to use any number of different loss functions (e.g., a mean squared error loss function, a mean squared logarithmic error loss function, a mean absolute error loss function, a cross-entropy loss function, etc.) to compute loss values 230a-m. Based on batch of loss values 225, neural network manager 105 calculates an average of loss values 230a-m.

Then, neural network manager 105 uses the average of loss values 230a-m to generate a set of gradients during a backward pass of neural network 210. In some embodiments, neural network manager 105 generates the set of gradients using a backpropagation technique. Next, neural network manager 105 uses the set of gradients to adjust, at operation 230, weights 220a-n of neural network 210. In some embodiments, neural network manager 105 uses a gradient method (e.g., a gradient descent method, a stochastic gradient descent method, etc.) to adjust weights 220a-n in neural network 210.

FIG. 2 illustrates an example of an iteration of training neural network 210. In some embodiments, neural network manager 105 trains neural network 210 through a defined number of iterations, which is specified in the training parameters associated with neural network 210, using batches of samples randomly selected from the training data set that are the same size as batch of samples 200. In this training phase, weights 220a-n of neural network are adjusted in the backward pass of each iteration.

After the training phase, neural network 210 can be used for inference. When neural network 210 is used for inference, the forward pass portion of neural network 210 is utilized. That is, neural network manager 105 provides input data to neural network 210 and processes it through each of the layers 215a-n. The output generated by layer 215n is the output data associated with the input data. The output data may be a prediction generated by neural network 210 based on the learned values of its sets of weights 220a-n.

Figure 3:
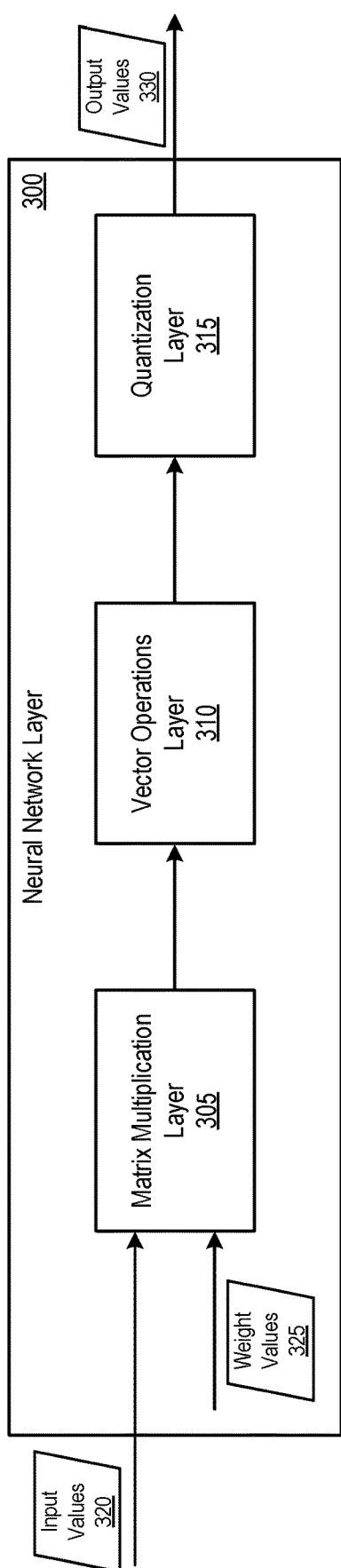
FIG. 3 illustrates an example neural network layer according to some embodiments.

FIG. 3 illustrates an example neural network layer 300 according to some embodiments. Specifically, FIG. 3 shows an example data flow through neural network layer 300. The example data flow may be a feed forward data flow that occurs during training of a neural network to which neural network layer 300 belongs or during the use of the neural network for inference. In some embodiments, neural network layer 300 can be used to implement any of the layers 215a-n of neural network 210.

As depicted in FIG. 3, neural network layer 300 includes matrix multiplication layer 305, vector operations layer 310, and quantization layer 315. Matrix multiplication layer 305 is configured to receive two input matrices, perform sparsification operations on one or more of the input matrices, perform a set of matrix multiplication operations (e.g., a set of dot product operations) on the two inputs, and generate an output matrix that is the result of the set of matrix multiplication operations. In some embodiments, sparsification engine 110 is used to implement the sparsification operations. Vector operations layer 310 receives an input matrix, performs a set of vector operations (e.g., softmax operations, activation operations, normalize operations, etc.) on the input matrix, and generates an output matrix that is the result of the set of vector operations. Quantization layer 315 is responsible for receiving an input matrix, performing a set of quantization operations to reduce the precision of values in the input matrix, and generate an output matrix that includes the reduced precision values. In some embodiments, quantizer 315 is used to implement the set of quantization operations.

The example data flow shown in FIG. 3 starts by matrix multiplication layer 305 receiving input values 320 and weight values 325. Input values 320 can be a matrix of activation values received from a previous layer in the neural network. For instance, if neural network layer 300 is used to implement layer 215c of neural network 210, then input values 320 may be a matrix of activation values received from, and generated by, layer 215b. Weight values 325 can be a matrix of weigh values included in neural network layer 300. Continuing with the example where neural network layer 300 is used to implement layer 215c of neural network 210, weight values 325 is a matrix that includes the set of weight values 220c. Upon receiving weight values 325, matrix multiplication layer 325 performs a set of sparsification operations to add sparsity to weight values 325 (e.g., converting weight values to a value of 0, removing weight values, etc.). Next, matrix multiplication layer 305 performs a set of matrix multiplication operations on input values 320 and the sparsified weight values 325 to generate an output matrix that is the result of the set of matrix multiplication operations. Matrix multiplication layer 305 provides the output matrix as an input to vector operations layer 310.

When vector operations layer 310 receives the output matrix from matrix multiplication layer 305, vector operations layer 310 performs a set of vector operations on the matrix to generate an output matrix that is the result of the set of vector operations. Examples of vector operations can include softmax operations, activation operations, normalize operations, etc. Once the set of vector operations are performed, vector operations layer 310 provides the output matrix as an input to quantization layer 315. In response to receiving the matrix, quantization layer 315 performs a set of quantization operations on the matrix to generate output values 330. The set of quantization operations reduces the precision of values in the matrix. Output values 330 can be a matrix that includes the reduced precision values represented using a narrow data format. Quantization layer 315 provides output values 330 as an input to the next layer in the neural network. Continuing with the example where neural network layer 300 is used to implement layer 215c of neural network 210, quantization layer 315 would provide output values 330 as an input to layer 215d.

Figure 4:
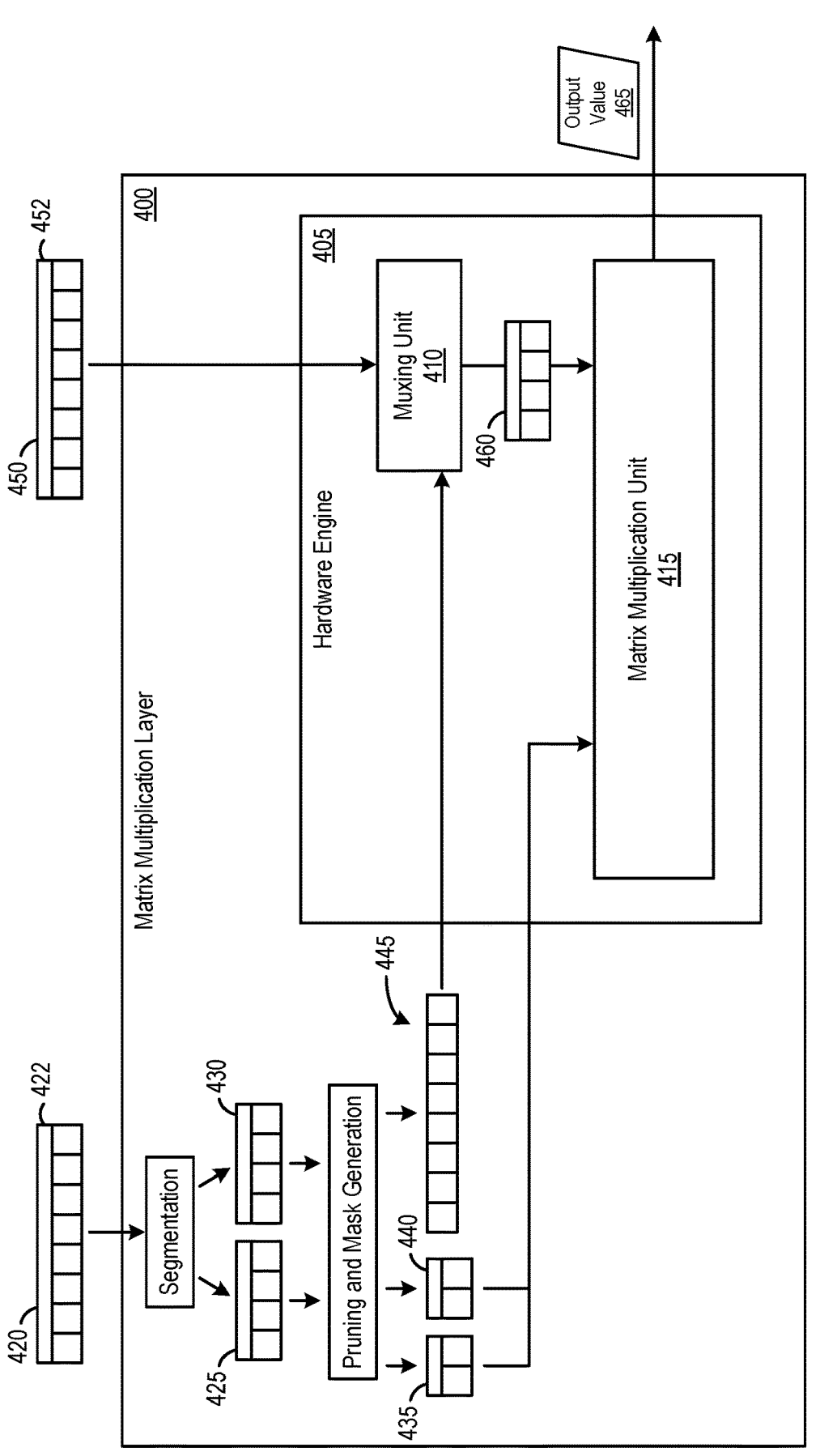
FIG. 4 illustrates an example matrix multiplication layer according to some embodiments.

FIG. 4 illustrates an example matrix multiplication layer 400 according to some embodiments. In particular, FIG. 4 illustrates an example of sparsifying one of two inputs to a matrix multiplication layer and performing matrix multiplication on the two inputs. In some embodiments, matrix multiplication layer 400 may be used to implement matrix multiplication layer 305. As depicted in FIG. 4, matrix multiplication layer 400 includes hardware engine 405, which includes muxing unit 410 and matrix multiplication unit 415. Muxing unit 410 and matrix multiplication unit 415 can each be implemented by a set of circuits.

As shown, matrix multiplication layer 400 receives a first input 420 and a second input 450. In this example, input 420 is a vector of eight weight values from a matrix of weight values (not shown in FIG. 4) included in a neural network layer (e.g., weight values 325 in neural network layer 300). The eight weight values are represented using a narrow floating point data format that uses a low-bit mantissa (e.g., 1-4 bits) and a shared exponent 422 (e.g., a shared 8-bit exponent). Here, the exponent block size, which represents a number of values that share an exponent, is eight. As such, the eight weight values in input 420 all share one exponent value. Input 450 is a vector of eight activation values from a matrix of activation values received from, and generated by, a previous neural network layer. The eight activation values are represented using the same narrow floating point data format that uses a low-bit mantissa and a shared exponent 452. As mentioned, the exponent block size in this example is eight. As such, the eight activation values in input 450 all share one exponent value.

When matrix multiplication layer 400 receives input 420, sparsification engine 110 segments input 420 into blocks based on the sparsity block size specified in the training parameters. For this example, the sparsity block size is four. As such, sparsification engine 110 segmented input 420 into blocks 425 and 430, which each includes four weight values from input 420. In some embodiments, the sparsity block size is a factor of the exponent block size. For instance, in this example, the sparsity block size of four is a factor of the exponent block size of eight (i.e., 8 is evenly divisible by 4). Next, sparsification engine 110 prunes weight values from each of the blocks 425 and 430 based on the defined proportion of values to keep in a sparsity block specified in the training parameters. Here, the defined proportion is 50%. In this example, sparsification engine 110 determines 50% of the weight values in block 425 having the highest absolute values and generates block 435 that includes those weight values (i.e., sparsification engine 110 drops the other weight values from block 425). In addition, sparsification engine 110 determines 50% of the weight values in block 430 having the highest absolute values and generates block 440 that includes the weight values (i.e., sparsification engine 110 drops the other weight values from block 430). In some embodiments, instead of using absolute value, sparsification engine 110 can determine the weight values to keep based on any number of different metrics for measuring the importance of values (e.g., entropy, perplexity, etc.).

After pruning weight values from blocks 425 and 430, sparsification engine 110 generates bit mask 445 that includes a mask value for each weight value in input 420. For weight values that were not pruned (i.e., the weight values are included in the highest 50% of weight values in the respective block), sparsification engine 110 stores a first defined value (1 in this example) as the mask value in the corresponding position in bit mask 445. For weight values in input 420 that were pruned, sparsification engine 110 stores a second defined value (0 in this example) as the mask value in the corresponding position in bit mask 445. For example, if the first weight value in input 420 is included in the highest 50% of weight values in block 425, sparsification engine 110 stores a value of 1 in the first position of bit mask 445 (i.e., the leftmost position). If the first weight value in input 420 is not included in the highest 50% of weight values in block 425, sparsification engine 110 stores a value of 0 in the first position of bit mask 445. Sparsification engine 110 performs this operation for each weight value in input 420. In some embodiments where a neural network layer, which matrix multiplication layer 400 is implementing, is being used for inference, bit mask 445 can be pre-calculated (e.g., calculated offline before the neural network layer is used for inference). In other embodiments where a neural network layer, which matrix multiplication layer 400 is implementing, is being trained, bit mask 445 can be learned using a gradient descent technique. Once bit mask 445 is generated, sparsification engine 110 provides it as an input to muxing unit 410. Additionally, sparsification engine 110 provides blocks 435 and 440 together as an input to matrix multiplication unit 415.

Once matrix multiplication layer 400 receives input 450, matrix multiplication layer 400 provides it as an input to muxing unit 410. In response to receiving input 450 and bit mask 445, muxing unit 410 determines a subset of the activation values in input 450 based on the bit mask 445. In this example, muxing unit 410 determines the subset of input 450 by identifying activation values in input 450 that correspond to mask values of 1 in bit mask 445 and including them in the subset. For example, if the first, third, seventh, and eighth mask values in bit mask 445 have a mask value of 1, muxing unit 410 includes the first, third, seventh, and eighth activation values from input 450 in the subset. Then, muxing unit 410 generates output 460, which includes the determined subset of the activation values in input 450, and provides it as an input to matrix multiplication unit 415.

When matrix multiplication unit 415 receives blocks 435 and 440 as a first input and output 460 as a second input, matrix multiplication unit 415 performs a set of matrix multiplication operations on these two inputs to generate output value 465. For instance, matrix multiplication unit 415 can calculate a dot product between blocks 435 and 440 and output 460 to generate a scalar output for output value 465. Finally, matrix multiplication unit 415 provides output value 465 to the next layer in the neural network layer (e.g., vector operations layer 310).

In this example, matrix multiplication unit 415 is configured to perform a four-element dot product in one execution cycle. As such, matrix multiplication unit 415 can perform the dot product between blocks 435 and 440 (a first input of four values) and output 460 (a second input of four values) in one execution cycle. If matrix multiplication unit 415 performed a dot product between inputs 420 and 450, it would have taken two execution cycles (i.e., a first cycle to calculate the dot product between the first four values in each of the inputs 420 and 450 and a second cycle to calculate the dot product between the last four values in each of the inputs 420 and 450). Therefore, using the sparsification technique described above by reference to FIG. 4 yields a 50% reduction of the number of execution cycles (i.e., a 2× speed increase) to determine a product between inputs 420 and 450.

As explained, the example operation described above by reference to FIG. 4 illustrates how a vector of weight values from a matrix of weight values and a vector of activation values from a matrix of activation values are processed through matrix multiplication layer 400. Accordingly, this operation can be repeated for remaining vectors of weight values in the matrix of weight values and vectors of activation values in the matrix of activation values.

Figure 5:
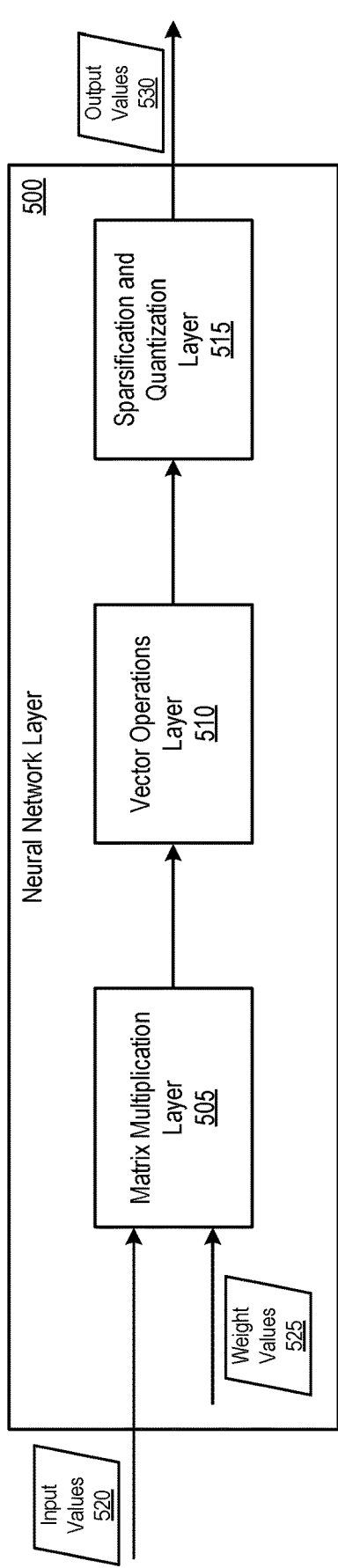
FIG. 5 illustrates another example neural network layer according to some embodiments.

The neural network layer described above by reference to FIG. 3 includes a layer that performs quantization operations (e.g., quantization layer 315). In some embodiments, a neural network layer may include a layer that performs sparsification operations. FIG. 5 illustrates another example neural network layer 500 according to some embodiments. In particular, FIG. 5 depicts an example data flow through a neural network layer that includes a layer for performing sparsification operations. The example data flow can be a feed forward data flow that occurs during training of a neural network to which neural network layer 500 belongs or during the use of the neural network for inference. In some embodiments, neural network layer 500 can be used to implement any of the layers 215*a*-*n* of neural network 210.

As illustrated in FIG. 5, neural network layer 500 includes matrix multiplication layer 505, vector operations layer 510, and sparsification and quantization layer 515. Matrix multiplication layer 505 can be implemented by matrix multiplication layer 305 and vector operations layer 510 can be implemented by vector operations layer 310. Sparsification and quantization layer 515 is similar to quantization layer 315 except sparsification and quantization layer 515 is also configured to perform a set of sparsification operations on the input matrix (e.g. implemented by sparsification engine 110). In some embodiments, the set of quantization operations are performed on the input matrix before the set of sparsification operations are performed on the input matrix. In other embodiments, the set of quantization operations are performed on the input matrix after the set of sparsification operations are performed on the input matrix. Still, in some embodiments, the set of quantization operations can be performed on the input matrix in combination with the set of sparsification operations.

The example data flow depicted in FIG. 5 begins by matrix multiplication layer 505 receiving input values 520 and weight values 525. Input values 320 may be a matrix of activation values received from a previous layer in the neural network. For example, if neural network layer 500 is used to implement layer 215*b* of neural network 210, then input values 520 may be a matrix of activation values received from, and generated by, layer 215*a*. Weight values 525 can be a matrix of weigh values included in neural network layer 500. Continuing with the example in which neural network layer 500 is used to implement layer 215*b* of neural network 210, weight values 525 is a matrix that includes the set of weight values 220*b*.

After receiving weight values 525, matrix multiplication layer 505 performs a set of sparsification operations to add sparsity to weight values 525 (e.g., converting weight values to a value of 0, removing weight values, etc.). In this example, matrix multiplication layer 505 also performs a set of sparsification operations to add sparsity to input values 520 (e.g., converting values to a value of 0, removing values, etc.). Matrix multiplication layer 505 then performs a set of matrix multiplication operations on sparsified input values 520 and the sparsified weight values 525 to generate an output matrix that is the result of the set of matrix multiplication operations. Matrix multiplication layer 505 provides the output matrix as an input to vector operations layer 510.

In response to receiving the output matrix from matrix multiplication layer 505, vector operations layer 510 performs a set of vector operations on the matrix to generate an output matrix that is the result of the set of vector operations. As explained above, some examples of vector operations may include softmax operations, activation operations, normalize operations, etc. After the set of vector operations are performed, vector operations layer 510 provides the output matrix as an input to sparsification and quantization layer 515. Upon receiving the matrix, sparsification and quantization layer 515 performs a set of quantization operations and a set of sparsification operations on the matrix to generate output values 530. The set of quantization operations reduces the precision of values in the matrix while the set of sparsification operations adds sparsity to the matrix (e.g., converting values to a value of 0, removing values, etc.). Output values 530 can be a matrix that includes the sparsified and reduced precision values represented using a narrow data format. Sparsification and quantization layer 515 provides output values 530 as an input to the next layer in the neural network. Continuing with the example where neural network layer 500 is used to implement layer 215*b* of neural network 210, sparsification and quantization layer 515 would provide output values 530 as an input to layer 215*c*.

Figure 6:
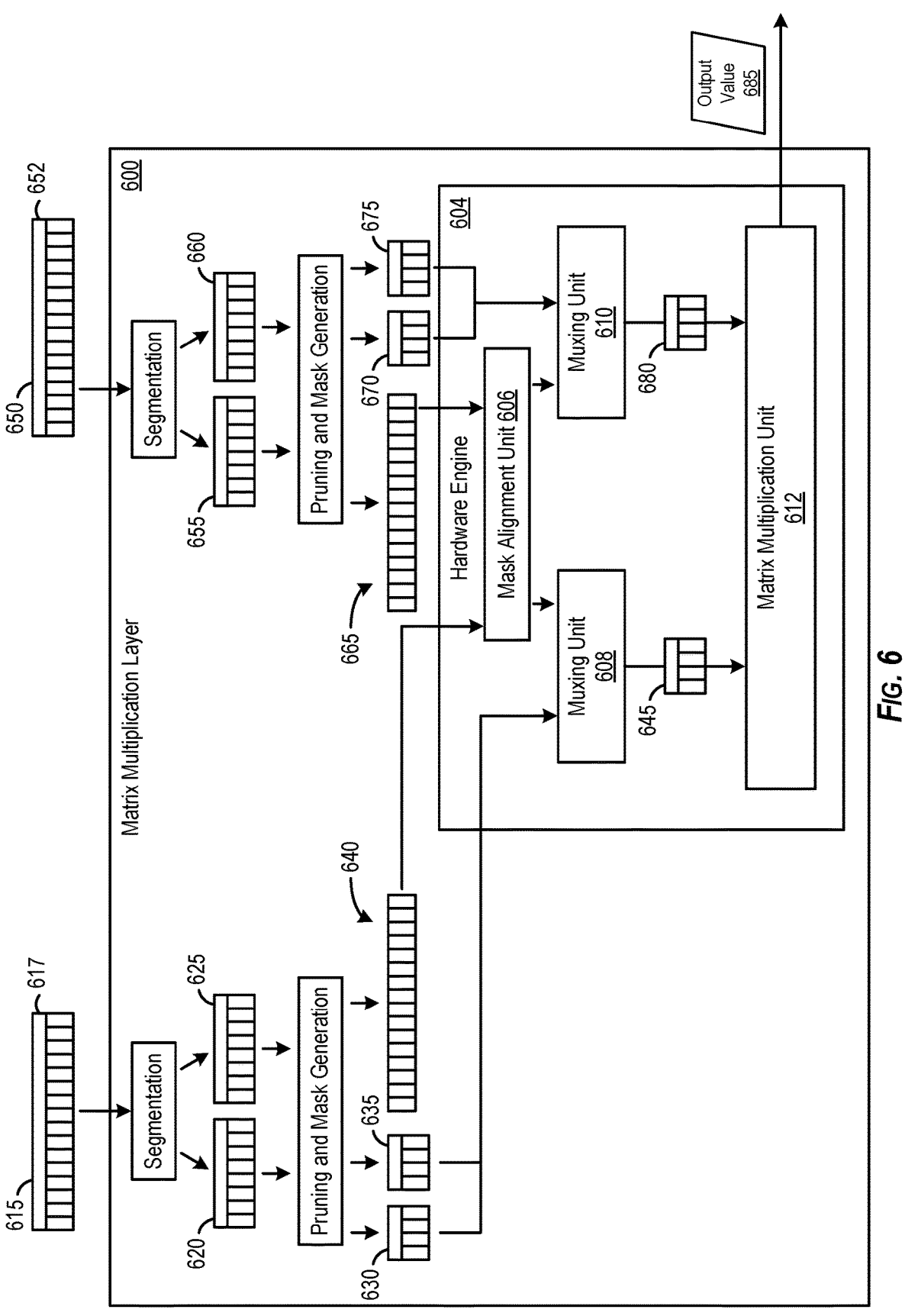
FIG. 6 illustrates another example matrix multiplication layer according to some embodiments.

FIG. 6 illustrates an example matrix multiplication layer 600 according to some embodiments. Specifically, FIG. 6 illustrates an example of sparsifying each of the inputs to a matrix multiplication layer and performing matrix multiplication on the two inputs. In some embodiments, matrix multiplication layer 600 may be used to implement matrix multiplication layer 505. As depicted in FIG. 6, matrix multiplication layer 600 includes hardware engine 604. Hardware engine 604 includes mask alignment unit 606, muxing unit 608, muxing unit 610, and matrix multiplication unit 612. Mask alignment unit 606, muxing unit 608, muxing unit 610, and matrix multiplication unit 612 can each be implemented by a set of circuits.

As illustrated in FIG. 6, matrix multiplication layer 600 receives a first input 615 and a second input 650. In this example, input 615 is a vector of sixteen weight values from a matrix of weight values (not shown in FIG. 6) included in a neural network layer (e.g., weight values 525 in neural network layer 500). The sixteen weight values are represented using a narrow floating point data format that uses a low-bit mantissa (e.g., 1-4 bits) and a shared exponent 617 (e.g., a shared 8-bit exponent). For this example, the exponent block size, which represents a number of values that share an exponent, is sixteen. Thus, the sixteen weight values in input 615 all share one exponent value. Input 650 is a vector of sixteen activation values from a matrix of activation values received from, and generated by, a previous neural network layer. The sixteen activation values are represented using the same narrow floating point data format that uses a low-bit mantissa and a shared exponent 652. As described above, the exponent block size is sixteen for this example. Hence, the sixteen activation values in input 650 all share one exponent value.

In response to matrix multiplication layer 600 receiving input 615, sparsification engine 110 segments input 615 into blocks based on the sparsity block size specified in the training parameters. In this example, the sparsity block size is eight. Accordingly, sparsification engine 110 segmented input 615 into blocks 620 and 625, which each includes eight weight values from input 615. In some embodiments, the sparsity block size is a factor of the exponent block size. For instance, in this example, the sparsity block size of eight is a factor of the exponent block size of sixteen (i.e., 16 is evenly divisible by 8). Next, sparsification engine 110 prunes weight values from each of the blocks 620 and 625 based on the defined proportion of values to keep in a sparsity block specified in the training parameters. For this example, the defined proportion is 50%. As shown in FIG. 6, sparsification engine 110 determines 50% of the weight values in block 620 having the highest absolute values and generates block 630 that includes those weight values (i.e., sparsification engine 110 drops the other weight values from block 620). Additionally, sparsification engine 110 determines 50% of the weight values in block 625 having the highest absolute values and generates block 635 that includes the weight values (i.e., sparsification engine 110 drops the other weight values from block 625). In some embodiments, instead of using absolute value, sparsification engine 110 can determine the weight values to keep based on any number of different metrics for measuring the importance of values (e.g., entropy, perplexity, etc.).

Once sparsification engine 110 finishes pruning weight values from blocks 620 and 625, sparsification engine 110 generates bit mask 640 that includes a mask value for each weight value in input 615. For weight values that were not pruned (i.e., the weight values are included in the highest 50% of weight values in the respective block), sparsification engine 110 stores a first defined value (1 in this example) as the mask value in the corresponding position in bit mask 640. For weight values in input 615 that were pruned, sparsification engine 110 stores a second defined value (0 in this example) as the mask value in the corresponding position in bit mask 640. Sparsification engine 110 repeats this operation for each weight value in input 615. In some embodiments where a neural network layer, which matrix multiplication layer 600 is implementing, is being used for inference, bit mask 640 can be pre-calculated (e.g., calculated offline before the neural network layer is used for inference). In other embodiments where a neural network layer, which matrix multiplication layer 600 is implementing, is being trained, bit mask 640 can be learned using a gradient descent technique. After generating bit mask 640, sparsification engine 110 provides it as an input to mask alignment unit 606. Also, sparsification engine 110 provides both blocks 630 and 635 as an input to muxing unit 608.

When matrix multiplication layer 600 receives input 650, sparsification engine 110 segments input 650 into blocks based on the sparsity block size, which is eight in this example. Therefore, sparsification engine 110 segmented input 650 into blocks 655 and 660, which each includes eight activation values from input 650. Sparsification engine 110 then prunes activation values from each of the blocks 655 and 650 based on the defined proportion of values to keep in a sparsity block specified in the training parameters, which is 50% for this example. Accordingly, sparsification engine 110 determines 50% of the activation values in block 655 having the highest absolute values and generates block 670 that includes those activation values (i.e., sparsification engine 110 drops the other activation values from block 655). Sparsification engine 110 also determines 50% of the activation values in block 660 having the highest absolute values and generates block 675 that includes the activation values (i.e., sparsification engine 110 drops the other activation values from block 660). In some embodiments, instead of using absolute value, sparsification engine 110 can determine the activation values to keep based on any number of different metrics for measuring the importance of values (e.g., entropy, perplexity, etc.).

After completing the pruning of activation values from blocks 655 and 660, sparsification engine 110 generates bit mask 665 that includes a mask value for each activation value in input 650. For activation values that were not pruned (i.e., the activation values are included in the highest 50% of activation values in the respective block), sparsification engine 110 stores a first defined value (1 in this example) as the mask value in the corresponding position in bit mask 665. For activation values in input 650 that were pruned, sparsification engine 110 stores a second defined value (0 in this example) as the mask value in the corresponding position in bit mask 665. Sparsification engine 110 performs this operation for each activation value in input 650. In some embodiments where a neural network layer, which matrix multiplication layer 600 is implementing, is being used for inference, bit mask 665 may be calculated on the fly (as opposed to bit mask 640, which may be pre-calculated). In other embodiments where a neural network layer, which matrix multiplication layer 600 is implementing, is being trained, bit mask 665 may be learned using a gradient descent technique. Once sparsification engine 110 generates bit mask 665, sparsification engine 110 provides bit mask 665 as an input to mask alignment unit 606. In addition, sparsification engine 110 provides both blocks 670 and 675 as an input to muxing unit 610.

In response to receiving bit mask 640 and bit mask 665, mask alignment unit 606 performs an element-by-element multiplication of bit masks 640 and 665 to generate an alignment mask, which includes the product of each pair of corresponding elements in bit masks 640 665. For instance, the first element in the alignment mask stores the product between the first element in bit mask 640 and the first element in bit mask 665, the second element in the alignment mask stores the product between the second element in bit mask 640 and the second element in bit mask 665, the third element in the alignment mask stores the product between the third element in bit mask 640 and the third element in bit mask 665, and so on and so forth. In some embodiments, an objective function (e.g., a loss function) may be utilized to maximize the overlap of the first defined values in bit masks 640 and 665 during training. Then, mask alignment unit 606 sends the alignment mask and bit mask 640 to muxing unit 608. Mask alignment unit 606 also sends the alignment mask and bit mask 665 to muxing unit 610.

When muxing unit 608 receives the alignment mask, bit mask 640, block 630, and block 635, muxing unit 608 determines a subset of the weight values in blocks 630 and 635 based on the alignment mask and bit mask 640. To determine which weight values in blocks 630 and 635 to include in the subset of blocks 630 and 635, muxing unit 608 iterates through the mask values in bit mask 640. If a mask value stores a value of 1, muxing unit 608 looks at the same position in the alignment mask. If the mask value at the position also stores a values of 1, then muxing unit 608 includes the weight value in the subset. Otherwise, muxing unit 608 continues iterating through bit mask 640 in the same manner. Here, muxing unit 608 includes the first four weight values identified in this manner in the subset. In some embodiments, muxing unit 608 includes all identified weight values in the subset. Then, muxing unit 608 generates output 645, which includes the subset of weight values in blocks 630 and 635, and provides it as an input to matrix multiplication unit 612. Muxing unit 610 uses the same techniques to determine a subset of the activation values in blocks 670 and 675 based on the alignment mask and bit mask 665. Muxing unit 610 generates an output 680, which includes the subset of the activation values in blocks 670 and 675, and provides it as an input to matrix multiplication unit 612. In some embodiments, muxing units 608 and 610 each employs a row sharing technique where multiple subsets of values (e.g., blocks 630 and 635 for muxing unit 608, blocks 670 and 675 for muxing unit 610) in the same positions (e.g., each subset of weight values includes values for positions 2, 3, 4, 6, 8, 11, 12, and 16 of the respective input) are iteratively processed together. This way, the cost of muxing is reduced because the index for used to process these multiple subset of values is the same and, thus, can be reused to process each of the subsets of values.

Upon receiving outputs 645 and 680, matrix multiplication unit 612 performs a set of matrix multiplication operations on these two inputs to generate output value 685. For example, matrix multiplication unit 612 may calculate a dot product between blocks outputs 645 and 670 to generate a scalar output for output value 685. Matrix multiplication unit 612 then provides output value 685 to the next layer in the neural network layer (e.g., vector operations layer 510).

In this example, matrix multiplication unit 612 is configured to perform a four-element dot product in one execution cycle. Here, matrix multiplication unit 612 can perform the dot product between output 645 (a first input of four values) and output 680 (a second input of four values) in one execution cycle. In some embodiments where muxing unit 608 and muxing unit 610 includes all identified weight values in their respective subsets, matrix multiplication unit 612 can perform the dot product between output 645 (a first input of four values) and output 680 (a second input of four values) in between one and two execution cycles. Now, if matrix multiplication unit 612 performed a dot product between inputs 615 and 650, it would have taken four execution cycles (i.e., a first cycle to calculate the dot product between the first four values in each of the inputs 615 and 650, a second cycle to calculate the dot product between the second four values in each of the inputs 615 and 650, a third cycle to calculate the dot product between the third four values in each of the inputs 615 and 650, and a fourth cycle to calculate the dot product between the last four values in each of the inputs 615 and 650). Hence, using the sparsification technique described above by reference to FIG. 6 reduces the number of execution cycles to determine a product between inputs 620 and 650 by 50-75% (i.e., a 2-4× speed increase).

The example operation described above by reference to FIG. 6 depicts how a vector of weight values from a matrix of weight values and a vector of activation values from a matrix of activation values are processed through matrix multiplication layer 600. As such, this operation can be repeated for remaining vectors of weight values in the matrix of weight values and vectors of activation values in the matrix of activation values.

FIG. 7 illustrates a process 700 for sparsifying narrow data formatted data according to some embodiments. In some embodiments, computing system 100 performs process 700. Process 700 starts by providing, 710, a plurality of activation values received from a first layer in a neural network to a muxing unit configured to implement a second layer in the neural network. The plurality of activation values are represented using a first plurality of low-bit mantissa values and a first shared exponent value. Referring to FIG. 4 as an example, when matrix multiplication layer 400 receives input 450, matrix multiplication layer 400 provides it as an input to muxing unit 410.

Next, process 700 performs, at 720, a set of sparsification operations on a plurality of weight values included in the second layer in the neural network to generate a subset of the plurality of weight values and a plurality of mask values associated with the plurality of weight values. The plurality of weight values are represented using a first plurality of low-bit mantissa values and a second shared exponent value. Referring to FIGS. 1 and 4 as an example, sparsification engine 110 performs the set of sparsification operations on input 420 to generate blocks 435 and 440 as well as bit mask 445.

Finally, process 700 provides, at 730, the subset of the plurality of weight values to a matrix multiplication unit configured to implement the second layer in the neural network. The muxing unit is further configured to generate a subset of the plurality of activation values based on the plurality of mask values and provide the subset of the plurality of activation values to the matrix multiplication unit. The matrix multiplication unit is configured to perform a set of matrix multiplication operations on the subset of the plurality of weight values and the subset of the plurality of activation values to generate a set of outputs. Referring to FIGS. 1 and 4 as an example, sparsification engine 110 provides blocks 435 and 440 as an input to matrix multiplication unit 415. Muxing unit 410 generates output 460, which is a subset of input 450. Matrix multiplication unit 415 performs the set of matrix multiplication operations on output 460 and blocks 435 and 440 to generate output value 465.

Figure 8:
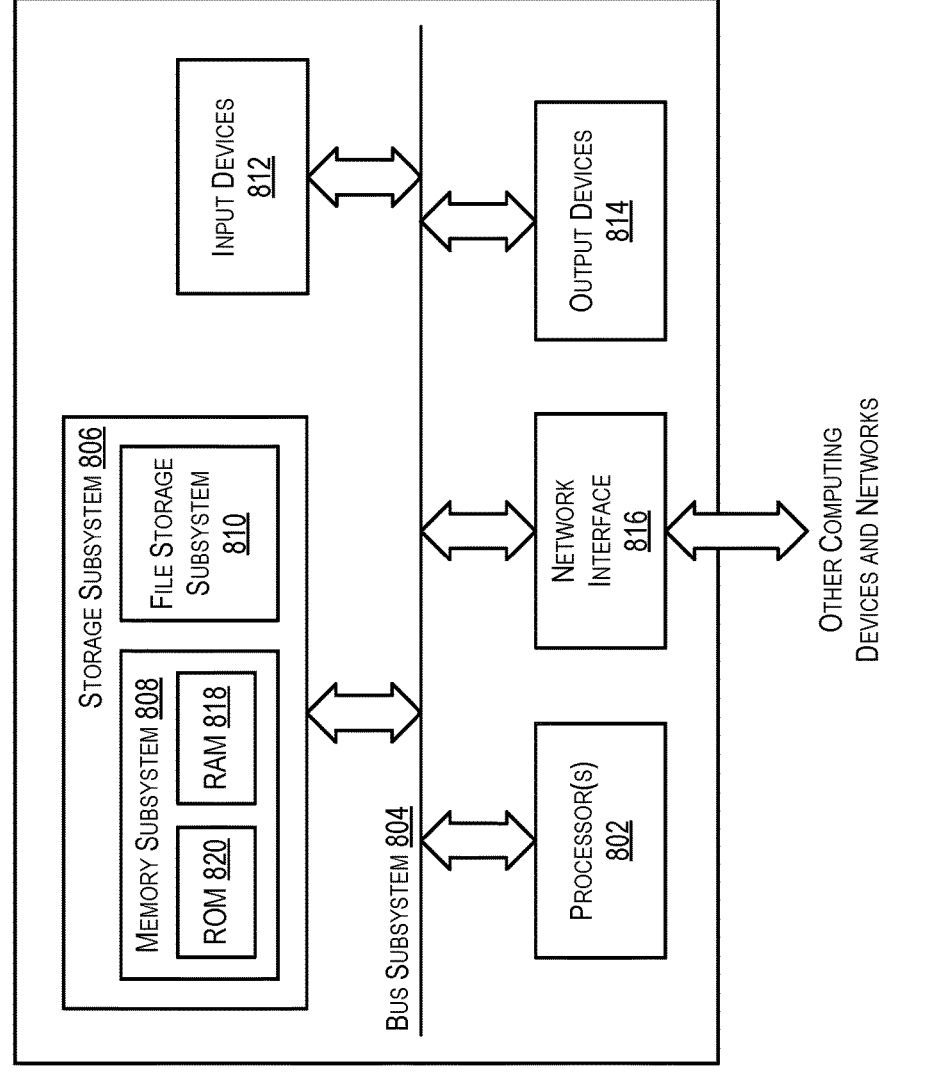
FIG. 8 depicts a simplified block diagram of an example computer system according to some embodiments.

The techniques describe above may be implemented in a wide range of computer systems configured to process neural networks. FIG. 8 depicts a simplified block diagram of an example computer system 800, which can be used to implement the techniques described in the foregoing disclosure. As shown in FIG. 8, computer system 800 includes one or more processors 802 that communicate with a number of peripheral devices via a bus subsystem 804. These peripheral devices may include a storage subsystem 806 (e.g., comprising a memory subsystem 808 and a file storage subsystem 810) and a network interface subsystem 816. Some computer systems may further include user interface input devices 812 and/or user interface output devices 814.

Bus subsystem 804 can provide a mechanism for letting the various components and subsystems of computer system

800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., Ethernet, a Wi-Fi and/or cellular adapter, a modem (telephone, satellite, cable, ISDN, etc.), digital subscriber line (DSL) units, and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

FIG. 9 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 902, which may comprise architectures illustrated in FIG. 8 above, may be coupled to a plurality of controllers 910(1)-910(M) over a communication network 901 (e.g. switches, routers, etc.). Controllers 910(1)-910(M) may also comprise architectures illustrated in FIG. 8 above. Each controller 910(1)-910(M) may be coupled to one or more NN processors, such as processors 911(1)-911(N) and 912(1)-912(N), for example. NN processors 911(1)-911(N) and 912(1)-912(N) may include a variety of configurations of functional processing blocks and memory optimized for neural network processing, such as training or inference. The NN processors are optimized for neural network computations. Server 902 may configure controllers 910 with NN models as well as input data to the models, which may be loaded and executed by NN processors 911(1)-911(N) and 912(1)-912(N) in parallel, for example. Models may include layers and associated weights as described above, for example. NN processors may load the models and apply the inputs to produce output results.

NN processors may also implement training algorithms described herein, for example.

Further Example Embodiments

In various embodiments, the present disclosure includes systems, methods, and apparatuses for sparsifying narrow data formats for neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device. The program comprises sets of instructions for providing a plurality of activation values received from a first layer in a neural network to a muxing unit configured to implement a second layer in the neural network, wherein the plurality of activation values are represented using a first plurality of low-bit mantissa values and a first shared exponent value; performing a set of sparsification operations on a plurality of weight values included in the second layer in the neural network to generate a subset of the plurality of weight values and a plurality of mask values associated with the plurality of weight values, wherein the plurality of weight values are represented using a first plurality of low-bit mantissa values and a second shared exponent value; and providing the subset of the plurality of weight values to a matrix multiplication unit configured to implement the second layer in the neural network, wherein the muxing unit is further configured to generate a subset of the plurality of activation values based on the plurality of mask values and provide the subset of the plurality of activation values to the matrix multiplication unit, wherein the matrix multiplication unit is configured to perform a set of matrix multiplication operations on the subset of the plurality of weight values and the subset of the plurality of activation values to generate a set of outputs.

In one embodiment, performing the set of sparsification comprises dividing the plurality of weight values into groups of weight values based on a defined group size; for each group of weight values in the groups of weight values, determining a defined proportion of weight values in the group of weight values having the highest values; wherein the subset of the plurality of weight values is generated by including, for each group of weight values in the groups of weight values, weight values in the determined proportion of weight values in the subset of the plurality of weight values, wherein the plurality of mask values associated with the plurality of weight values is generated by, for each weight value in the plurality of weight values storing a first defined value as the mask value in the plurality of mask values associated with the weight value if the weight value is included in the subset of the plurality of weight values, and storing a second defined value as the mask value in the plurality of mask values associated with the weight value if the weight value is not included in the subset of the plurality of weight values.

In one embodiment, the present disclosure further comprises performing a set of vector operations on the set of outputs In one embodiment, the present disclosure further comprises, after performing the set of vector operations, performing a set of quantization operations on the set of outputs generated by the matrix multiplication unit to reduce precision of the set of outputs.

In one embodiment, the present disclosure further comprises, sending the quantized set of outputs as inputs to a third layer of the neural network.

In one embodiment, the present disclosure further comprises, after performing the set of quantization operations, performing a set of sparsification operations on the quantized set of outputs to add sparsity to the quantized set of outputs.

In one embodiment, the present disclosure further comprises, before performing the set of quantization operations, performing a set of sparsification operations to the set of outputs to add sparsity to the set of outputs.

In one embodiment, the present disclosure further comprises, before performing the set of vector operations, performing a set of quantization operations on the set of outputs generated by the matrix multiplication unit to reduce precision of the set of outputs.

In one embodiment, each low-bit mantissa value in the first plurality of low-bit mantissa values comprises four or less bits and each low-bit mantissa value in the second plurality of low-bit mantissa values comprises four or less bits.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:
   providing a first vector to a muxing unit within a second layer of a neural network, the first vector comprising a plurality of activation values received from a first layer in a neural network;
   performing a set of sparsification operations on a plurality of weight values included in the second layer in the neural network, the set of sparsification operations including:
   selecting a first subset of the plurality of weight values to be pruned and a second subset of the plurality of weight values to be retained following a pruning operation;
   generating a mask that includes a plurality of mask values associated with the plurality of weight values, the plurality of mask values including a first defined value at indices corresponding to the first subset of the plurality of weight values selected to be pruned and a second defined value at indices corresponding to the second subset of the plurality of weight values selected to be retained following the pruning operation;
   providing the second subset of the plurality of weight values to a matrix multiplication unit configured to implement the second layer in the neural network;
   providing the plurality of mask values to the muxing unit, wherein the muxing unit is further configured to condense a length of the first vector by dropping a first subset of the plurality of activation values corresponding to a first defined value in the mask while retaining a second subset of the plurality of activation values at indices corresponding to a second defined value in the mask;
   wherein the matrix multiplication unit is configured to perform a set of matrix multiplication operations on the second subset of the plurality of weight values and the second subset of the plurality of activation values to generate a set of outputs.

2. The non-transitory machine-readable medium of claim 1, wherein performing the set of sparsification operations comprises:
   dividing the plurality of weight values into groups of weight values based on a defined group size;
   for each group of weight values in the groups of weight values, determining a defined proportion of weight values in the group of weight values having the highest values;
   wherein the second subset of the plurality of weight values is generated by including, for each group of weight values in the groups of weight values, weight values in the defined proportion of weight values in the second subset of the plurality of weight values,
   wherein the plurality of mask values associated with the plurality of weight values is generated by, for each weight value in the plurality of weight values:
   storing the second defined value as a mask value in the plurality of mask values associated with the weight value if the weight value is included in the second subset of the plurality of weight values, and
   storing the first defined value as the mask value in the plurality of mask values associated with the weight value if the weight value is not included in the second subset of the plurality of weight values.

3. The non-transitory machine-readable medium of claim 1, wherein the program further comprises a set of instructions for performing a set of vector operations on the set of outputs.

4. The non-transitory machine-readable medium of claim 3, wherein the program further comprises a set of instructions for, after performing the set of vector operations, generating a quantized set of outputs by performing a set of quantization operations on the set of outputs generated by the matrix multiplication unit to reduce precision of the set of outputs.

5. The non-transitory machine-readable medium of claim 4, wherein the program further comprises a set of instructions for sending the quantized set of outputs as inputs to a third layer of the neural network.

6. The non-transitory machine-readable medium of claim 4, wherein the program further comprises a set of instructions for, after performing the set of quantization operations, performing a set of sparsification operations on the quantized set of outputs to add sparsity to the quantized set of outputs.

7. The non-transitory machine-readable medium of claim 4, wherein the program further comprises a set of instructions for, before performing the set of quantization operations, performing a set of sparsification operations to the set of outputs to add sparsity to the set of outputs.

8. The non-transitory machine-readable medium of claim 3, wherein the program further comprises a set of instructions for, before performing the set of vector operations, performing a set of quantization operations on the set of outputs generated by the matrix multiplication unit to reduce precision of the set of outputs.

9. The non-transitory machine-readable medium of claim 1, wherein the plurality of weight values are represented using a first plurality of low-bit mantissa values and a second shared exponent value, and wherein each low-bit mantissa value in the first plurality of low-bit mantissa values comprises four or less bits.

10. A method comprising:

providing a first vector to a muxing unit within a second layer of a neural network, the first vector comprising a plurality of activation values received from a first layer in a neural network;

performing a set of sparsification operations on a plurality of weight values included in the second layer in the neural network, the set of sparsification operations including:

selecting a first subset of the plurality of weight values to be pruned and a second subset of the plurality of weight values to be retained following a pruning operation;

generating a mask that includes a plurality of mask values associated with the plurality of weight values, the plurality of mask values, the plurality of mask values including a first defined value at indices corresponding to the first subset of the plurality of weight values selected to be pruned and a second defined value at indices corresponding to the second subset of the plurality of weight values selected to be retained following the pruning operation;

providing the second subset of the plurality of weight values to a matrix multiplication unit configured to implement the second layer in the neural network, providing the plurality of mask values to the muxing unit, wherein the muxing unit is further configured to condense a length of the first vector by dropping a first subset of the plurality of activation values corresponding to a first defined value in the mask while retaining a second subset of the plurality of activation values at indices corresponding to a second defined value in the mask;

wherein the matrix multiplication unit is configured to perform a set of matrix multiplication operations on the second subset of the plurality of weight values and the second subset of the plurality of activation values to generate a set of outputs.

11. The method of claim 10, wherein performing the set of sparsification operations comprises:

dividing the plurality of weight values into groups of weight values based on a defined group size;

for each group of weight values in the groups of weight values, determining a defined proportion of weight values in the group of weight values having the highest values;

wherein the second subset of the plurality of weight values is generated by including, for each group of weight values in the groups of weight values, weight values in the defined proportion of weight values in the second subset of the plurality of weight values, wherein the plurality of mask values associated with the plurality of weight values is generated by, for each weight value in the plurality of weight values:

storing the second defined value as a mask value associated with the weight value if the weight value is included in the second subset of the plurality of weight values, and storing the first defined value as the mask value associated with the weight value if the weight value is not included in the subset of the plurality of weight values.

12. The method of claim 10 further comprising performing a set of vector operations on the set of outputs.

13. The method of claim 12 further comprising, after performing the set of vector operations, generating a quantized set of outputs by performing a set of quantization operations on the set of outputs generated by the matrix multiplication unit to reduce precision of the set of outputs.

14. The method of claim 13 further comprising sending the quantized set of outputs as inputs to a third layer of the neural network.

15. The method of claim 13 further comprising, after performing the set of quantization operations, performing a set of sparsification operations on the quantized set of outputs to add sparsity to the quantized set of outputs.

16. The method of claim 13 further comprising before performing the set of quantization operations, performing a set of sparsification operations to the set of outputs to add sparsity to the set of outputs.

17. The method of claim 12 further comprising, before performing the set of vector operations, performing a set of quantization operations on the set of outputs generated by the matrix multiplication unit to reduce precision of the set of outputs.

18. The method of claim 10, wherein the plurality of activation values are represented using a first plurality of low-bit mantissa values and a first shared exponent value, and wherein each low-bit mantissa value in the first plurality of low-bit mantissa values comprises four or less bits.

19. A non-transitory machine-readable medium storing a program executable by at least one processing unit of a device, the program comprising sets of instructions for:

performing, within a second layer of a neural network,;

a first set of sparsification operations on a weight vector comprising a plurality of weight values, the weight vector included in the second layer in the neural network, the first set of sparsification operations including:

selecting a first subset of the plurality of weight values that satisfy a first criteria and a second subset of the plurality of weight values that do not satisfy the first criteria;

generating a first mask that includes a first plurality of mask values associated with the plurality of weight values, the first plurality of mask values including a first defined value at indices corresponding to the first subset of the plurality of weight values and a second defined value at indices corresponding to the second subset of the plurality of weight values;

performing a second set of sparsification operations on an activation vector comprising a plurality of activation values received from a first layer in a neural network, the second set of sparsification operations including:

selecting a first subset of the plurality of activation values satisfying a second criteria and a second subset of the plurality of activation values that do not satisfy the second criteria;

generating a second mask that includes a second plurality of mask values associated with the second subset of the plurality of activation values, the first defined value at indices corresponding to the first subset of the plurality of activation values and the second defined value at indices corresponding to the second subset of the plurality of activation values;

determining, at a mask alignment unit, a set of alignment mask values based on the first plurality of mask values and the second plurality of mask values;

provide the first subset of the plurality of activation values and the set of alignment mask values to a first muxing unit, wherein the first muxing unit is configured to condense a length of the activation vector by using the set of alignment mask values to select a third subset of activation values from the first subset of the plurality of activation values; and provide the first subset of the plurality of weight values and the set of alignment mask values to a second muxing unit, the second muxing unit being configured to condense a length of the weight vector by using the set of alignment mask values to select a third subset of weight values from the first subset of the plurality of weight values;

providing the third subset of weight values and the third subset of activation values to a matrix multiplication unit configured to implement the second layer of the neural network; and wherein the matrix multiplication unit is configured to perform a set of matrix multiplication operations on the third subset of weight values and the third subset of activation values to generate a set of outputs.

20. The non-transitory machine-readable medium of claim 19, wherein performing the second set of sparsification operations on the plurality of activation values comprises:

dividing the plurality of activation values into groups of activation values based on a defined group size;

for each group of activation values in the groups of activation values, determining a second defined proportion of activation values in the group of activation values having the highest values, wherein the first subset of the plurality of activation values is generated by including, for each group of activation values in the groups of activation values, activation values in the second determined proportion of activation values in the first subset of the plurality of activation values;

generating the second mask associated with the plurality of activation values by, for each activation value in the plurality of activation values:

storing the first defined value as a mask value in the second plurality of mask values associated with the activation value if the activation value is included in the first subset of the plurality of activation values, and storing the first defined value as the mask value in the second plurality of activation values associated with the activation value if the activation value is not included in the first subset of the plurality of activation values.

* * * * *